United States Patent
Jones

(10) Patent No.: US 9,652,370 B2
(45) Date of Patent: May 16, 2017

(54) ADDRESS RANGE DECOMPOSITION

(71) Applicant: NATIONAL INSTRUMENTS CORPORATION, Austin, TX (US)

(72) Inventor: Craig S. Jones, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 561 days.

(21) Appl. No.: 14/097,924

(22) Filed: Dec. 5, 2013

(65) Prior Publication Data

US 2015/0161068 A1 Jun. 11, 2015

(51) Int. Cl.
| | |
|---|---|
| *G06F 13/36* | (2006.01) |
| *G06F 12/00* | (2006.01) |
| *H04L 12/947* | (2013.01) |
| *H04L 12/931* | (2013.01) |
| G06F 13/40 | (2006.01) |
| G06F 13/38 | (2006.01) |
| H04L 12/751 | (2013.01) |

(52) U.S. Cl.
CPC ............ *G06F 12/00* (2013.01); *H04L 49/25* (2013.01); *H04L 49/35* (2013.01); *G06F 13/385* (2013.01); *G06F 13/4022* (2013.01); *G06F 13/4027* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 6,425,033 | B1 * | 7/2002 | Conway | G06F 13/4045 710/107 |
| 6,748,478 | B1 * | 6/2004 | Burke | G06F 13/4027 710/10 |
| 7,165,136 | B2 * | 1/2007 | Dennis | G06F 13/4027 710/104 |
| 7,324,231 | B2 * | 1/2008 | Davis | G06F 13/4027 358/1.15 |
| 8,386,654 | B2 * | 2/2013 | Brinkmann | G06F 13/404 710/8 |
| 2010/0036995 | A1 * | 2/2010 | Nakayama | G06F 13/4022 710/316 |
| 2012/0166690 | A1 * | 6/2012 | Regula | G06F 13/404 710/104 |

* cited by examiner

*Primary Examiner* — Henry Tsai
*Assistant Examiner* — Aurangzeb Hassan
(74) *Attorney, Agent, or Firm* — Meyertons Hood Kivlin Kowert & Goetzel, P.C.; Jeffrey C. Hood; Mark S. Williams

(57) ABSTRACT

Smart bridge and use. The smart bridge includes a functional unit, memory, and a switch for routing data between a host and multiple devices using a routing table. The bridge stores a forwarding address range (FAR) as a bridge representation of hardware memory resources required by the devices. The FAR is an integer multiple of a first specified minimum size and is aligned with the first specified minimum size. The bridge representation is converted to an endpoint representation that includes multiple virtual memory resources based on a starting address of the FAR. Each virtual memory resource has a respective sub-address range with a size that is a power of 2 multiple of a second specified minimum size, which is less than the first specified minimum size, and is aligned accordingly. The endpoint representation is usable by the switch or the host to allocate the virtual memory resources to the devices.

18 Claims, 6 Drawing Sheets

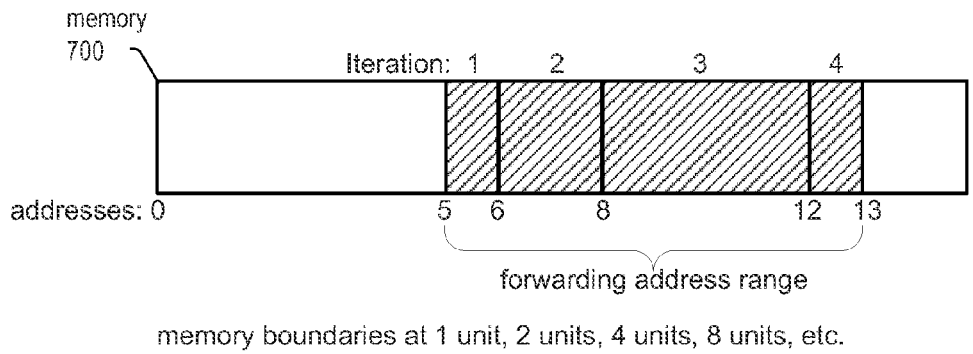

memory boundaries at 1 unit, 2 units, 4 units, 8 units, etc.

exemplary pseudo-code:

```
Addr = Base address of forwarding address range
Size = Size of forwarding address range SubRange = 1
While (Size) {
   mask = (1 << LeastSignificantBitSet(Size)) – 1
   if (Addr & mask)
      size[SubRange] = 1 << LeastSignificantBitSet(Addr)
   else
      size[SubRange] = 1 << MostSignificantBitSet(Size))
   addr[SubRange] = Addr
   Size -= size[SubRange]
   Addr += size[SubRange]
}

Iteration 1:
  Addr = 5, Size = 8, mask = 0111b, (Addr & mask) = 0101b
  size[1] = 1 << lsb(Addr) = 1, addr[1] = 5

Iteration 2:
  Addr = 6, Size = 7, mask = 0011b, (Addr & mask) = 0010b
  size[2] = 1 << lsb(Addr) = 2, addr[2] = 6

Iteration 3:
  Addr = 8, Size = 5, mask = 0000b, (Addr & mask) = 0000b
  size[3] = 1 << msb(Size) = 4, addr[3] = 8

Iteration 4:
  Addr = 12, Size = 1, mask = 0000b, (Addr & mask) = 0000b
  size[4] = 1 << msb(Size) = 1, addr[4] = 12
```

FIG. 7

ADDRESS RANGE DECOMPOSITION

BACKGROUND OF THE INVENTION

Field of the Invention

This invention relates generally to bus interfaces, and, more particularly, to address range decomposition, e.g., for a Peripheral Component Interconnect Express (PCIe) Bus, and a smart bridge implementation thereof.

Description of the Related Art

PCI Express (Peripheral Component Interconnect Express, also abbreviated as PCIe), is a high-speed serial computer expansion bus standard offering numerous improvements over the older PCI, PCI-X, and AGP (Accelerated Graphics Port) bus standards. These improvements include higher maximum system bus throughput, lower I/O pin count and a smaller physical footprint, better performance-scaling for bus devices, more detailed error detection and reporting mechanism, and native hot-plug functionality. Conceptually, the PCIe bus is a high-speed serial interconnect bus using shared address/data lines. Accordingly, the PCIe bus differs from the older PCI bus in its bus topology. While PCI uses a shared parallel bus architecture, where the PCI host and all devices share a common set of address/data/control lines, the PCIe bus is based on a point-to-point topology, with separate serial links connecting every device to the root complex (or host). Because of this shared bus topology, access to the older PCI bus is arbitrated (in the case of multiple masters), and limited to one master at a time, in a single direction.

As mentioned above, PCIe devices communicate via a logical connection referred to as an interconnect or a link, which provides a point-to-point communication channel between two PCIe ports, allowing both ports to send/receive PCI-requests (such as configuration read/write, I/O read/write, memory read/write) and interrupts. In a system that uses PCI or PCIe bus, in order for a PCI device to be addressable, the device must first be mapped into the I/O port address space or the memory-mapped address space of the system. The system's firmware/device drivers or the operating system typically program the Base Address Registers (referred to as BARs) to inform the device of its address mapping by writing configuration commands to the PCI controller.

The PCIe eXtensions for Instrumentation (PXI Express)—introduced in 2005 by National Instruments—is one of several electronic instrumentation platforms in current use, and represents a modular instrumentation platform that leverages existing technology to deliver high performance and low cost modular instrumentation. PXI Express is ideally suited for building electronic test-equipment and/or automation systems, and complements the industry standard PCIe with extra features to facilitate electronic testing and data acquisition. PXI Express affords great flexibility in building test equipment and/or automation systems to exact requirements, often fitted with custom software for managing the entire system.

PXI Express was conceived for measurement and automation applications that typically require high-performance and a rugged industrial form-factor. PXI Express also allows for module selection from a large number of vendors, with the modules easily integrating into a single PXI Express system. Overall, PXI Express uses PC-based technology as part of an industry standard governed by the PXI Systems Alliance (PXISA), ensuring standards compliance and system interoperability. PXI Express modules are available for a wide variety of test, measurement, and automation applications, from switching modules to high performance microwave vector signal generation and analysis instruments.

PXI Express modules are typically designed to implement specific functions, such as analog signal capture, RF signal analysis, and/or waveform generation. PXI Express modules that provide instrument functions usually plug into a PXI Express chassis that may include its own controller running an industry standard Operating System (e.g. Windows XP, Windows 2000, and/or Linux), or a PCI Express-to-PXI Express bridge that provides a high-speed link to a desktop PC controller. Similarly, multiple PXI Express racks may be linked together with PCI Express bridges (or bridge cards) to build very large systems such as multiple source microwave signal generator test stands for complex ATE applications.

PCI devices have two ways to specify resources, base address registers (BARs) and forwarding address ranges (which may also be referred to as "forwarding ranges"). BARs have a relatively modest minimum size but both size and alignment are restricted to powers of two. PCI endpoints have only BARs to describe resource requirements.

When bridges were added to the PCI specification, forwarding address ranges were needed. BAR allocation restrictions would not work for forwarding ranges and so a new set of rules was created. In PCI, forwarding ranges have a minimum size of 1 MB (4 KB for IO) but no other alignment or size restrictions. Resources have the combined restrictions of the BAR(s) involved plus the combination of forwarding ranges those BARs are behind. This was not a problem originally because there were relatively few bridges with many BARs behind each bridge. With PCI Express, the most common case will typically have a single device with one BAR, or a small number of BARs, behind a bridge. This effectively imposes a 1 MB lower size bound on each BAR in the system.

In some current and near-future bus protocols, e.g., a next-generation MXI bus (Multisystem eXtension Interface Bus), also referred to as MXIbus, which is a high performance communication link for interconnecting devices, e.g., a GPIB card and a VXI cage, there are circumstances where bridge forwarding ranges may be required to be represented as BARs. A forwarding range will always be large but the BAR representation also imposes a power of two limit on both size and alignment. This can cause rapid acceleration of resource requirements due to fragmentation loss.

For example, consider a forwarding range of 3 MB that exists because it is forwarding three subordinate bridges which themselves are forwarding one BAR each. When the 3 MB range is represented as a BAR, it will be expanded to 4 MB in order to be represented as a power of two, which represents a ⅓ (~33%) increase in wasted allocation.

Accordingly, improved systems and methods for managing address allocations are desired.

SUMMARY OF THE INVENTION

Various embodiments of a system and method for address range decomposition with respect to a bus are presented.

In some embodiments, a smart bridge may be provided that is configured to be interposed between a bus host device and a plurality of devices that require respective amounts of memory resources of the bus host device. The smart bridge may include a functional unit, memory, coupled to the functional unit, and at least one switch, coupled to the functional unit, where the at least one switch may be configured to route data between the bus host device and the plurality of devices using a routing table. The memory may store program instructions executable by the functional unit to implement embodiments of a method for address decomposition disclosed herein.

In some embodiments, the method may include storing, by an embodiment of the smart bridge, a forwarding address range that includes or forms a bridge representation of a plurality of hardware memory resources required by a plurality of devices. The forwarding address range may be an integer multiple of a first specified minimum size, e.g., 1 MB, and may be aligned with the first specified minimum size. Note that the smart bridge may at times be referred to herein as simply "the bridge" for brevity—the context will make clear whether "bridge" refers to the smart bridge or a different, non-smart, bridge.

The method may further include converting, e.g., by the (smart) bridge, the bridge representation of the plurality of hardware memory resources to an endpoint representation. The endpoint representation may include or specify a plurality of virtual memory resources based on a starting address of the forwarding address range. Each virtual memory resource may include a respective sub-address range with a size that is a power of 2 multiple of a second specified minimum size and may be aligned with its size. The endpoint representation may be usable by the bridge or a bus host device to allocate the virtual memory resources to the plurality of devices.

In some embodiments, the bridge representation and the forwarding address range are binary numbers, and converting the bridge representation of the plurality of hardware memory resources to the endpoint representation may include: while there are virtual memory resources to allocate: determining if a current base address of the forwarding address range is aligned, allocating a next virtual memory resource to the forwarding address range at the current base address, where the size of the sub-address range of the virtual memory resource is based on the least significant 1 bit of the current base address, in response to determining that the starting address of the forwarding address range is not aligned, and allocating the next virtual memory resource to the forwarding address range at the current base address, where the size of the sub-address range of the virtual memory resource is based on the most significant 1 bit of the current forwarding address size, in response to determining that the starting address of the forwarding address range is aligned.

In some embodiments, the starting address is aligned, and the bridge representation is a binary number, in which case the number of virtual memory resources may be equal to the number of "1" bits in the bridge representation. Converting the bridge representation of the plurality of hardware memory resources to the endpoint representation may then include: for each "1" bit in the bridge representation, creating a respective virtual memory resource whose size is equal to the value of the "1" bit's position, and ordering the virtual memory resources based on the starting address of the forwarding address range, including assigning respective address sub-ranges to the respective virtual memory resources such that each sub-address range is aligned according to its size. The virtual memory resource sub-ranges may then be contiguous and may compose the forwarding address range. Moreover, assigning respective address sub-ranges to the respective virtual memory resources may include allocating the virtual memory resources to the forwarding address range beginning with the starting address, wherein the virtual memory resources are allocated from smallest up until an ending address of a virtual memory resource sub-range is aligned in accordance with the largest remaining virtual memory resource to be allocated, and allocating the remaining virtual memory resources from largest down.

In one embodiment, the method may further include configuring the routing table in accordance with the endpoint representation.

In some embodiments, the (smart) bridge may implement a proxy device based on the endpoint representation, whereby the (smart) bridge presents itself to the bus host device as the proxy device requesting the plurality of memory resources. Thus, the host may perceive the proxy device in lieu of the plurality of devices.

In some embodiment, the forwarding address range may be received from a downstream bridge, e.g., a standard (i.e., non-smart) bridge, interposed between the smart bridge and the plurality of devices.

The forwarding address may be specified in more than one way. For example, the forwarding address range may be or include the starting address and size of the forwarding address range, or the starting address and an ending address. Any other representations of the forwarding address range may be used as desired.

In some embodiment, the bridge may be configured to operate in accordance with a protocol, such as, for example, one or more of: Peripheral Component Interconnect Express (PCIe); or PXI Express (PXIe), among others.

BRIEF DESCRIPTION OF THE DRAWINGS

The foregoing, as well as other objects, features, and advantages of this invention may be more completely understood by reference to the following detailed description when read together with the accompanying drawings in which:

FIG. 7 illustrates an exemplary allocation and ordering of virtual memory resources in a forwarding address range, according to one embodiment.

Figure 1:
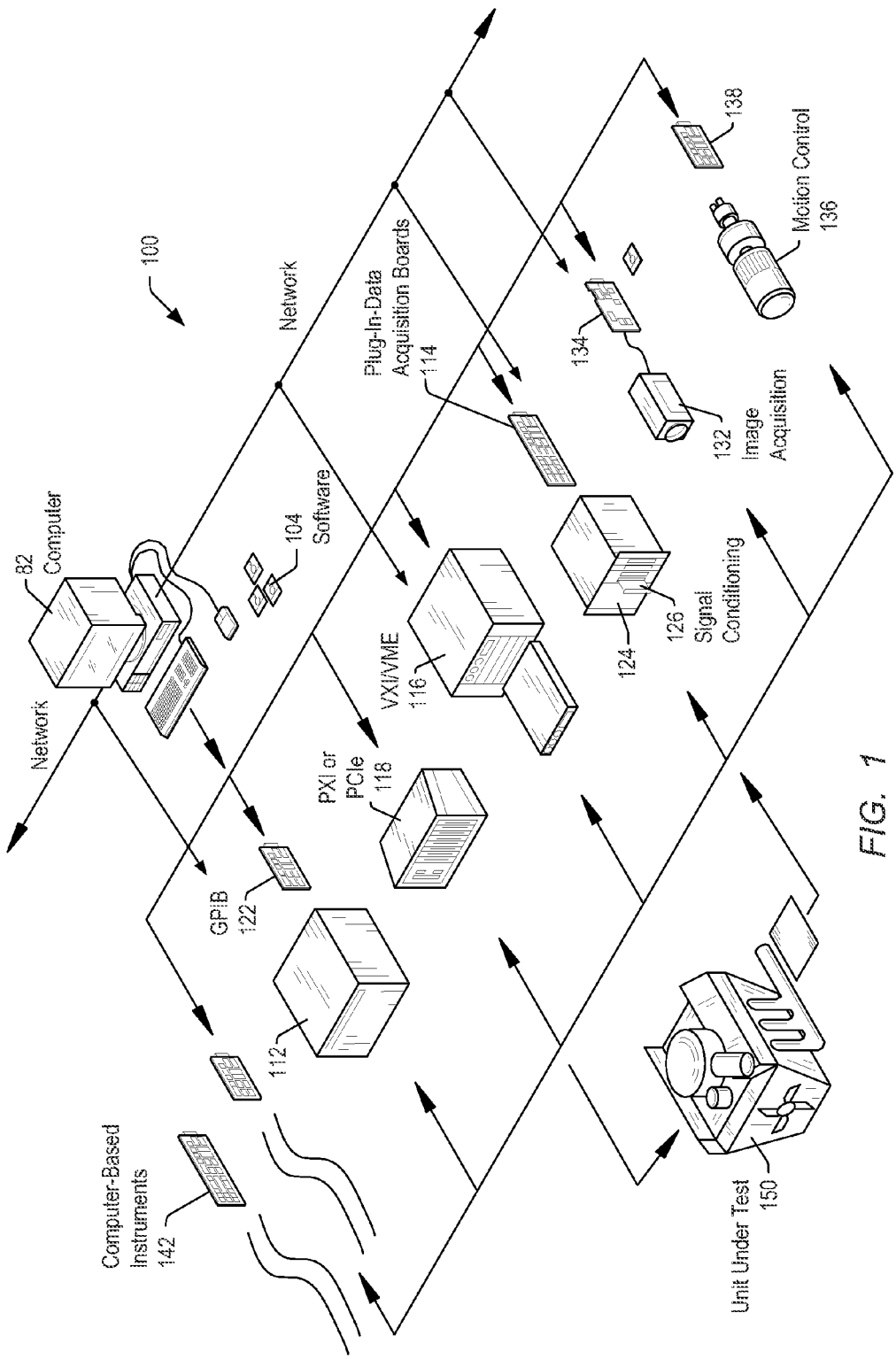
FIG. 1 shows an instrumentation control system with instruments networked together according to one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Incorporation by Reference:

The following references are hereby incorporated by reference in their entirety as though fully and completely set forth herein:

U.S. application Ser. No. 13/918,308, titled "Hidden Base Address Register Programming in Peripheral Component Interconnect Express Buses", filed Jun. 14, 2013, whose inventors were Craig S. Jones, Jonathan W. Hearn, and Jason D. Tongen.

U.S. application Ser. No. 13/918,435, titled "Packet Routing Based on Packet Type in Peripheral Component Interconnect Express Bus Systems", filed Jun. 14, 2013, whose inventors were Craig S. Jones and Robert D. Ross.

U.S. application Ser. No. 13/918,611, titled "Opaque Bridge For Peripheral Component Interconnect Express Bus System", filed Jun. 14, 2013, whose inventors were Eric R. Gardiner, Jonathan W. Hearn, Craig S. Jones, and Jason D. Tongen.

U.S. application Ser. No. 13/918,685, titled "Selectively Transparent Bridge For Peripheral Component Interconnect Express Bus Systems", filed Jun. 14, 2013, whose inventors were Jonathan W. Hearn, Craig S. Jones, and Robert D. Ross.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data.

Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

FIG. 1 illustrates an exemplary instrumentation control system 100 which may be configured according to embodiments of the present invention. System 100 comprises a host computer 82 which may couple to one or more instruments via a bus, e.g., a PCI Express bus, where the system is configured to implement embodiments of the present invention. Host computer 82 may comprise a CPU (Central Processing Unit), a display screen, memory, and one or more input devices such as a mouse or keyboard as shown. Computer 82 may operate with one or more instruments to analyze, measure, or control a unit under test (UUT) or process 150. The one or more instruments may include a GPIB (General Purpose Interface Bus) instrument 112 and associated GPIB interface card 122, a data acquisition board 114 inserted into or otherwise coupled with chassis 124 with associated signal conditioning circuitry 126, a VXI (VERSAmodule Eurocard [VME] eXtensions for Instrumentation) instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the UUT or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

The exemplary instrumentation control system 100 of FIG. 1 may use various embodiments of the smart bridge disclosed herein to communicatively couple a host device, e.g., host computer 82, with a plurality of devices. For example, in one exemplary embodiment, the host computer 82 may be or include a PCIe host device, which may couple to a plurality of PCIe (or PXI/PXIe) devices via the smart bridge.

Figure 2:
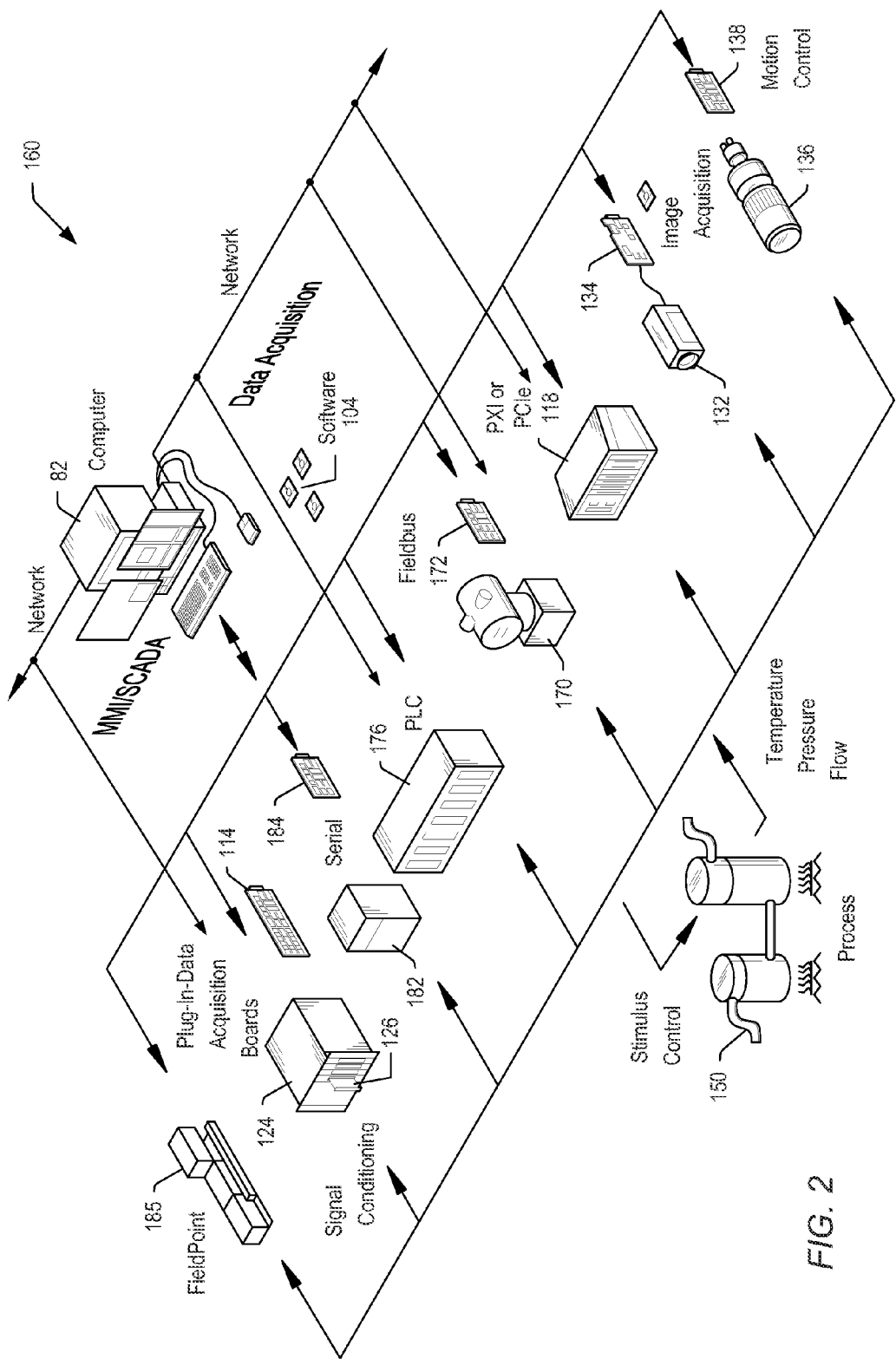
FIG. 2 shows an industrial automation system with instruments networked together according to one embodiment of the invention.

FIG. 2 illustrates an exemplary industrial automation system 160 that may be configured according to embodiments of the present invention. Industrial automation system 160 may be similar to instrumentation or test and measurement system 100 shown in FIG. 1. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection, which may facilitate running a high-level synchronization protocol between the computer system and the coupled instruments/devices.

As with the control system of FIG. 1, the exemplary industrial automation system 160 of FIG. 2 may use various embodiments of the smart bridge disclosed herein to communicatively couple a host device, e.g., host computer 82, with a plurality of devices, e.g., the host computer 82 may be or include a PCIe host device, which may couple to a plurality of PCIe (or PXI/PXIe) devices via the smart bridge.

As seen in FIG. 1 and FIG. 2, system 100 and/or system 160 may include one or more chassis or plug-in boards that use a PCIe (or PXI/PXIe) bus to couple one or more of a variety of different devices or functions which may interact with the host or host computer. As previously mentioned, PCI Express is point-to-point packet protocol, which appears in the system as a bus that couples together PCI devices. Therefore, any read and/or write operations initiated by a programmer to a PCI device on a PCIe bus are expected to look the same. Transactions that occur on the PCIe topology are expected to operate in the same manner as if they had been executed on a conventional PCI bus.

It should be noted that the particular PCIe (or PXI/PXIe) based embodiments described and illustrated are exemplary only, and that the present techniques may be used with other protocols and buses as desired.

Figure 3:
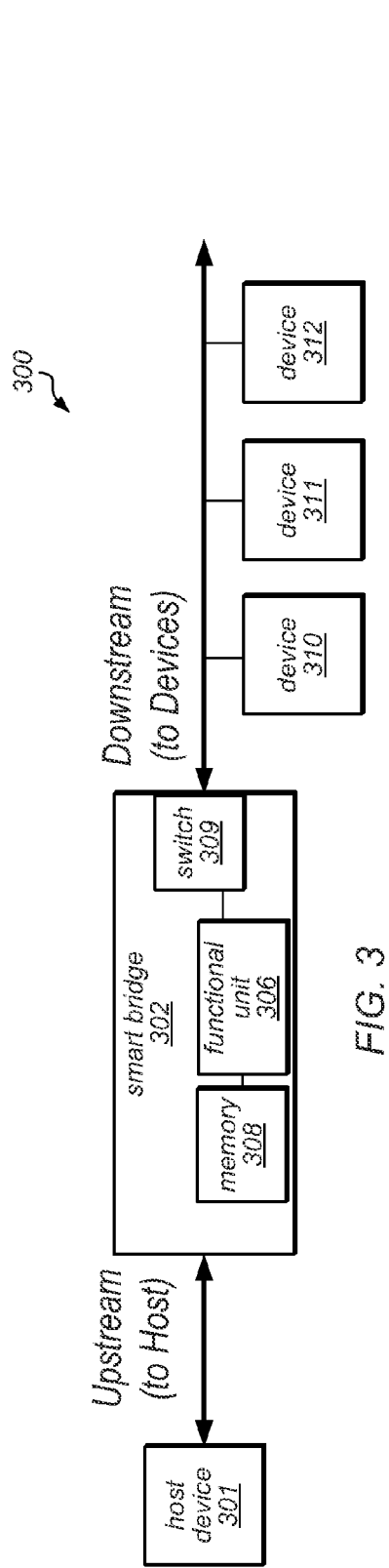
FIG. 3 shows a block diagram of an exemplary system that includes a smart bridge, according to one embodiment.
Figure 4:
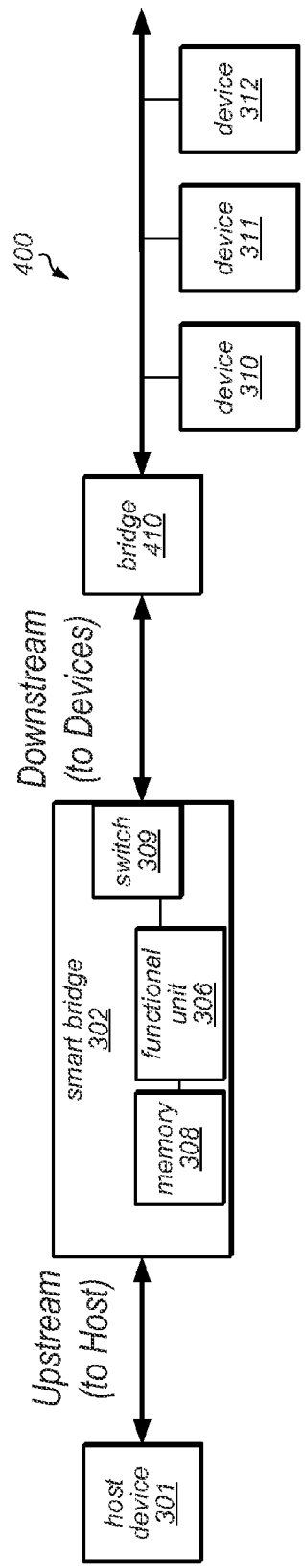
FIG. 4 shows a block diagram of another exemplary system that includes a smart bridge, according to one embodiment.

FIGS. 3 and 4—Exemplary Systems with Smart Bridge

FIGS. 3 and 4 show block diagrams of respective exemplary systems that include a smart bridge, according to embodiments of the invention. It should be noted that the term "smart bridge" is used herein to indicate that the bridge has processing capabilities beyond standard prior art bridges; specifically, that the bridge is configured to implement embodiments of the techniques disclosed herein.

As may be seen, in the exemplary system 300 of FIG. 3, a smart bridge 302 is interposed between a bus host device 301 and a plurality of devices (e.g., devices 310, 311, and 312) that require respective amounts of memory resources of the bus host device. Note that in other embodiments, different numbers of devices may be coupled to the smart bridge.

In this exemplary embodiment, the smart bridge includes a functional unit 306, a memory 308, coupled to the functional unit, and at least one switch 309, coupled to the functional unit. The at least one switch may be configured to route data between the bus host device and the plurality of devices using a routing table. In one embodiment, the at least one switch may include a "downstream switch" (or downstream portion) for communications between the smart bridge and the plurality of devices, and an "upstream switch" (or upstream portion) for communications between the bus host device and the smart bridge. The smart bridge may be configured to implement embodiments of the method described below with reference to FIGS. 5-7.

FIG. 4 shows a block diagram of another exemplary system 400 that includes a smart bridge, according to one embodiment. In this exemplary system 400, a bridge 410, e.g., a non-smart bridge, is interposed between the smart bridge 302 and the plurality of devices, and so the smart bridge 302 may operate in a different manner than in the system of FIG. 3, as will be described in more detail below.

Figure 5:
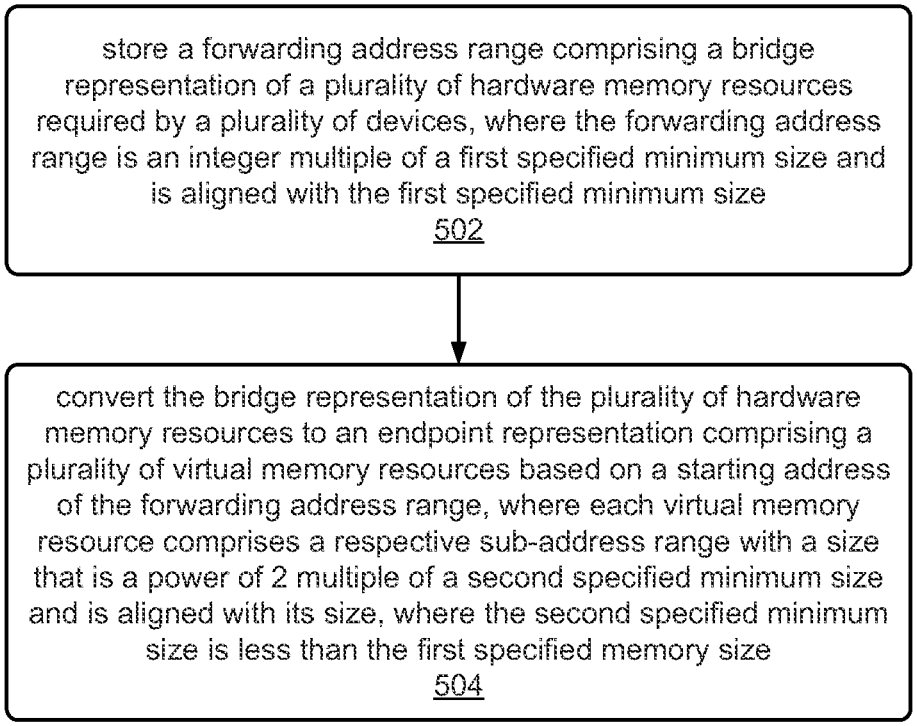
FIG. 5 is flowchart diagram illustrating one embodiment of a method for decomposition of a forwarding address range.

FIG. 5—Flowchart of a Method for Decomposition of a Forwarding Address Range FIG. 5 is flowchart diagram illustrating one embodiment of a method for decomposition of a forwarding address range. The method shown in FIG. 5 may be used in conjunction with any of the computer systems or devices shown in the above-described Figures, among other devices, although in a preferred embodiment, the method is performed by an embodiment of the smart bridge disclosed herein. In various embodiments, some of the method elements shown may be performed concurrently, in a different order than shown, or may be omitted. Additional method elements may also be performed as desired. As shown, this method may operate as follows.

In 502, a forwarding address range that is or includes a bridge representation of a plurality of hardware memory resources required by a plurality of devices may be stored, e.g., in the memory of the smart bridge. The forwarding address range may be an integer multiple of a first specified minimum size and may be aligned with the first specified minimum size. In other words, the forwarding address range may be constrained to have some specified minimum granularity, e.g., 1 MB in the case of PCI, and further, may be constrained to be aligned accordingly, meaning that the forwarding address range may be required to begin and end on respective 1 MB boundaries. Thus, the endpoints of the range may not be allowed to fall in between 1 MB boundaries. Note that other protocols may have different values of the first specified minimum size, e.g., 1 KB, 2 MB, 5 MB, etc., as desired or required. Note further that in various embodiments, the sizes disclosed herein may be in any memory units desired, e.g., bytes, pages, and so forth.

In 504, the bridge representation of the plurality of hardware memory resources may be converted to an endpoint representation comprising a plurality of virtual memory resources based on a starting address of the forwarding address range. Note that the term "virtual memory resource" is used herein to distinguish from the hardware memory resources requested by the plurality of devices, specifically, to indicate that the (virtual) memory resources may be considered to be an emulation of the actual hardware memory resources.

Each virtual memory resource may include a respective sub-address range with a size that is a power of 2 multiple of a second specified minimum size, and may be aligned with its size. In other words, each sub-address range size may be required to be a (second) specified size times a power of 2. This second specified minimum size may be any of various values, e.g., 4 KB, 64B, etc., as desired or required; but may be required to be less than the first specified minimum size. Moreover, each respective sub-address range may be required to be aligned in accordance with its size, i.e., may not be allowed to straddle boundaries of the second specified minimum size. Note that this constraint actually derives from the hardware memory resource requirements of the plurality of devices, which the virtual memory resources emulate. In some embodiments, the sizes of the sub-address ranges of the virtual memory resources may have a granularity of the first specified minimum size, e.g., 1 MB in the case of PCI, and may be aligned accordingly. Note further that in meeting this constraint, the second constraint (where the sub-address range sizes are required to be a power of 2 multiple of the second specified minimum size) is also met.

The resulting endpoint representation may then be usable by the at least one switch or the bus host device to allocate the virtual memory resources to the plurality of devices.

Figure 6:
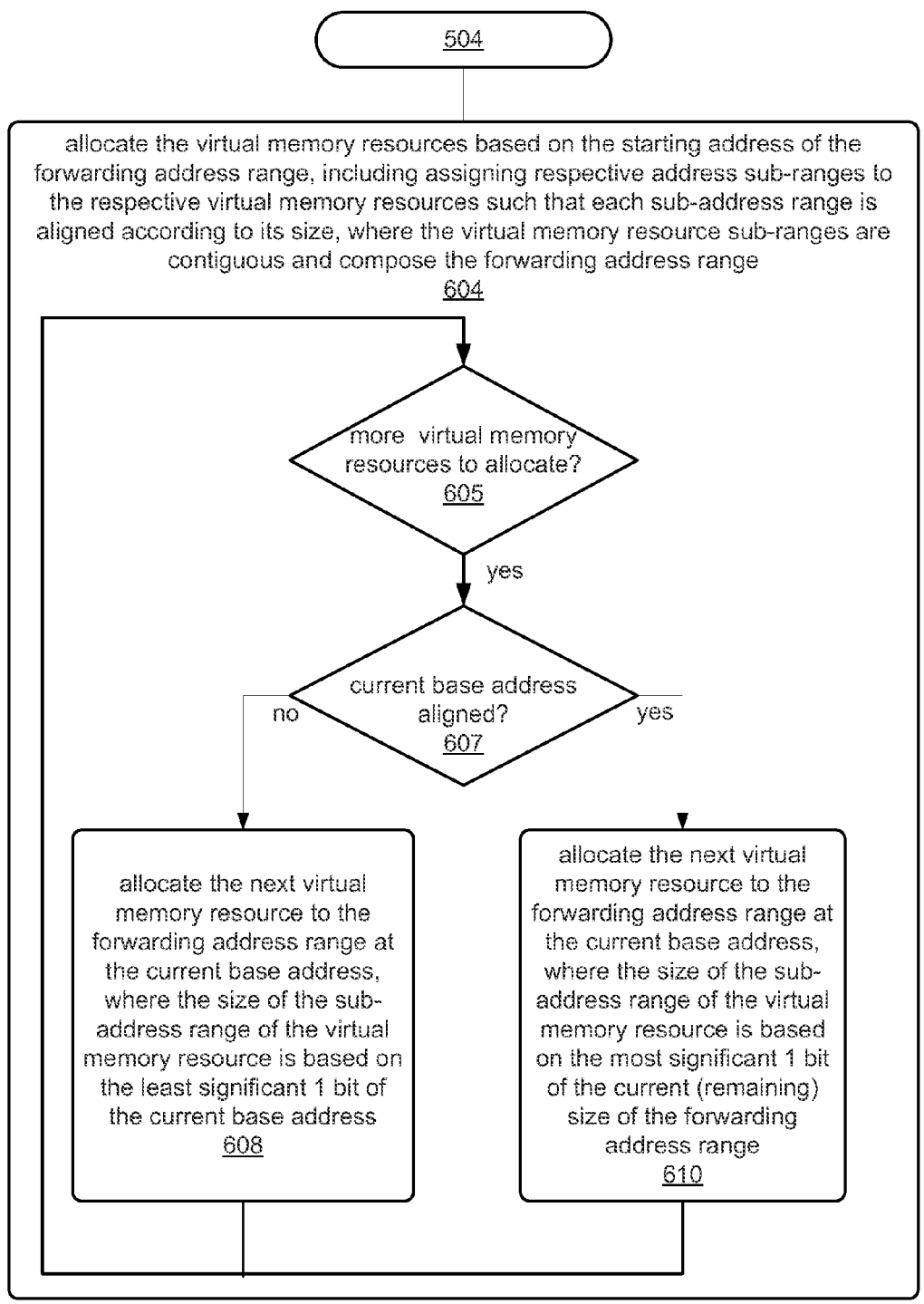
FIG. 6 is flowchart diagram illustrating one embodiment of a method for converting a bridge representation of hardware memory resources to an endpoint representation of virtual memory resources.

FIG. 6—Flowchart of a Method for Converting Bridge Representation to Endpoint Representation of Virtual Memory Resources In some embodiments, the bridge representation is a binary number, and in cases where the starting address of the forwarding address range is aligned nicely, e.g., on a memory boundary, the number of virtual memory resources may be equal to the number of "1" bits in the bridge representation. This follows from the "power of 2" nature of the sizes of the memory resources. However, in many cases, the starting address of the forwarding address range may not be so nicely aligned. In these cases, initial allocations of virtual memory resources may be made based on the least significant "1 bit" (or bit that has been set) of the current base address, as explained below in detail. As used herein, the term "alignment" refers to the (memory) size corresponding to the least significant 1 bit of the current base address, and may be used allocate sub-address ranges such that they do not straddle memory boundaries.

FIG. 6 is flowchart diagram illustrating one embodiment of a method for converting a bridge representation of hardware memory resources to an endpoint representation of virtual memory resources. The method shown in FIG. 6 may be used in conjunction with any of the computer systems or devices shown in the above-described Figures, among other devices, although in a preferred embodiment, the method is performed by an embodiment of the smart bridge disclosed herein. In various embodiments, some of the method elements shown may be performed concurrently, in a different order than shown, or may be omitted. Additional method elements may also be performed as desired. As shown, this method may operate as follows.

In 604, the virtual memory resources may be allocated (and ordered) based on the starting address of the forwarding address range, including assigning respective address sub-ranges to the respective virtual memory resources such that each sub-address range is aligned according to its size, where the virtual memory resource sub-ranges may be contiguous and may compose the forwarding address range. In other words, sub-addresses of the virtual memory resources may be positioned and ordered in such a way as to efficiently pack the sub-ranges while respecting memory boundaries, specifically, boundaries of the specified memory units, i.e., the first or second specified minimum size.

As FIG. 6 shows, in some embodiments, the allocation of 604 may be performed in the following manner:

In 605, a determination may be made as to whether there are more virtual memory resources to allocate, and if so, then in 607, the method may determine if the current base address is aligned, i.e., if it falls on a memory boundary. More specifically, the method may determine if the current base address is a power of two, e.g., 2, 4, 8, etc., memory units.

If the current base address (which is initially the starting address of the forwarding address range) is not aligned, then in 608, the next virtual memory resource (and thus its respective sub-address range) may be allocated to the forwarding address range at the current base address, where the size of the sub-address range of the virtual memory resource is based on the least significant 1 bit of the current base address.

If, on the other hand, the current base address is aligned (e.g., falls on a memory boundary, specifically, an address that is a power of two), then in 610, the next virtual memory resource (and thus its respective sub-address range) may be allocated to the forwarding address range at the current base address, where the size of the sub-address range of the virtual memory resource is based on the most significant 1 bit of the current forwarding address size.

As further indicated in FIG. 6, the method may then return to method element 601 and proceed as described above. Note that the method may terminate as soon as there are no more virtual memory resources to allocate. Thus, while there are virtual memory resources to allocate, method elements 607-610 may be performed repeatedly in an iterative manner.

Expressing the above in a slightly different way, if the starting address of the forwarding address range is not aligned, the virtual memory resources may be allocated to the forwarding address range beginning with the starting address, where the virtual memory resources are allocated from smallest up per the successive least significant 1 bits of the current base address until an ending address of a virtual memory resource sub-range is aligned in accordance with the largest remaining virtual memory resource to be allocated. Then, the remaining virtual memory resources may be allocated from largest down per the successive most significant 1 bits of the remaining size of the forwarding address range (which is a binary number). This process may be performed (repeated) as long as there are virtual memory resources to allocate.

Said another way, the virtual memory sub-address ranges may be assigned to the forwarding address range starting with the smallest sub-range, and assigning subsequent sub-address ranges of increasing size in contiguous fashion based on the least significant 1 bits of the successive values of the current base address, until a memory boundary is reached (with no overlap), i.e., where the most recent assigned sub-address range ends at (aligns with) a memory boundary, per the first specified minimum size. Then, the remaining virtual memory resource sub-ranges may be assigned to the forwarding address range from largest size down, specifically, where subsequent sub-address ranges of decreasing size are allocated in contiguous fashion based on the most significant 1 bits of the successive values of the current (remaining) size of the forwarding address range. Note that after each allocation, the current (remaining) size of the forwarding address range is less than the previous size by the amount allocated. Thus, as all of the virtual memory resources are allocated, the current/remaining size of the forwarding address range goes to zero.

Note that in the special cases where the starting address of the forwarding address range is aligned, for each "1" bit in the bridge representation (i.e., for each "set" bit), a respective virtual memory resource may be created whose size is equal to the value of the "1" bit's position (in appropriate units). Thus for example, for an exemplary bridge representation 0110, the sizes of the respective virtual memory resources may be (from smallest to largest), 2 units (e.g., 2 MB), corresponding to the 2's place, and 4 units (e.g., 4 MB), corresponding to the 4's place. Note, however, that in various embodiments, the memory resource unit (i.e., first or second specified minimum size) may be any size desired, e.g., 1 KB, etc.

However, in the more general case (where alignment of the starting address is a given), embodiments of the method of FIG. 6 may operate to allocate the sub-address ranges of the virtual memory resources in a manner that respects memory boundaries regardless of the starting address alignment (or non-alignment).

Summarizing and generalizing the above, the base address and size of the forwarding address range may be input to the process (method/smart bridge). The forwarding address range may be decomposed or broken down into a sum of sub-ranges (sub-address ranges) where each sub-range is a power of 2 times a specified minimum size (e.g., the second specified minimum size mentioned above, e.g., in PCIe/PXIe implementations, that conforms to PCI BAR requirements). The sum of all sub-range sizes may be equal to the forwarding range size, all subranges may be contiguous, and the lowest sub-range start address may be set to the forwarding address range start address.

The following pseudocode describes an exemplary implementation of this process:

```
Addr = Base address of forwarding range
Size = Size of forwarding range
SubRange = 1
While (Size) {
    mask = (1 << LeastSignifcantBitSet(Size)) − 1
    if (Addr & mask)
        size[SubRange] = 1 << LeastSignificantBitSet(Addr)
    else
    size[SubRange] = 1 << MostSignificantBitSet(Size))
        addr[SubRange] = Addr
        Size −= size[SubRange]
        Addr += size[SubRange]
}
```

Subrange sizes may be required to be powers of 2 (of the specified memory units) and to have an alignment equal to their size. The method may assign sub-ranges as large as the current base address allows until the address alignment becomes large enough to support the largest remaining sub-range. Afterwards, sub-ranges may be allocated largest to smallest.

Note that in one exemplary embodiment, due to alignment constraints, a decomposition of a range that is 2 units in size may result in a single two unit sub-range, or may require two one unit sub-ranges depending on initial alignment. Likewise, a 3 unit range may always be decomposed into a one unit and a two unit sub-range, but the order in which they are allocated may depend on additional alignment constraints, e.g., the alignment of the sub-address range endpoints with memory boundaries of the forwarding address range.

FIG. 7 illustrates an exemplary allocation and ordering of virtual memory resources in a forwarding address range, according to one embodiment, and further, presents detailed pseudo-code implementing the technique for this exemplary case.

As FIG. 7 illustrates, an exemplary forwarding address range is shown in the context of a larger memory 700, which in this case has a starting address of zero (0), and where the forwarding address range begins at address 5. Note that the exemplary addresses shown are in terms of some generic memory unit, e.g., units of 1 MB, per the first specified minimum size. Since the allocation is an iterative process, the iteration count is shown above the memory. In the example shown, there are four virtual memory resource sub-ranges to allocate, with respective sizes of 1, 1, 2, and 4.

In the exemplary pseudo-code shown, variable Addr refers to the base address of the forwarding address range, i.e., the address of the current edge of the allocated sub-address ranges, and so has an initial value of 5, as indicated; variable Size refers to the current/remaining memory of the forwarding address range to which sub-address ranges have not been allocated, which starts at 8, which is the size of the forwarding address range itself. An array "size[ ]" is used to store the respective sizes of the sub-address ranges, and an array "addr[ ]" is used to store the respective addresses of the starting sub-address ranges allocated to the forwarding address range.

As noted above, in a first iteration, the virtual memory resource with the smallest sub-address range is allocated first (e.g., based on the right-most/lease significant "1 bit" of the bridge representation of the forwarding address range), and so in iteration 1, a sub-address range with the smallest size, which is 1 unit (either of the 1 unit sub-ranges) is allocated, as shown by the hatched rectangle in the Figure under iteration 1, and as expressed in the pseudo-code under "Iteration 1:", where Addr (beginning of the forwarding address range)=5, and addr[1] is set to 5, since the 1 unit sub-address range is allocated to this position/address.

As FIG. 7 further illustrates, the (unallocated) forwarding address range size is now 7 (8-1), and the updated base address is now 6, which is not a power of two times the memory unit, and so in iteration 2, the next larger sub-address range is allocated, in this case, a 2 unit sub-address range, after which the updated base address is 8, which is a power of two times the memory unit, and so subsequent allocations will be made from largest down. The updated (unallocated) forwarding address range is now 5 (8−1−2).

The largest remaining sub-address ranges is a 4 unit range, and so in iteration 3, this range is allocated to the forwarding address range at address 8, and the updated forwarding base address is now 12, as shown in the Figure and expressed in the pseudo-code, where the size of the (unallocated) forwarding memory range is now 1 unit, and where there is one remaining sub-address range (of the last virtual memory resource) to be allocated.

Accordingly, in iteration 4, the final 1 unit (which is also the next largest size after the above 3 unit range) sub-address range is allocated at the current base forwarding address of 12, as shown, at which point all of the sub-address ranges have been allocated, resulting in a contiguous, continuous, arrangement of the sub-address ranges in the forwarding address range, where the arrangement meets the memory alignment constraint(s).

Further Embodiments

The following presents further embodiments of the above techniques, although it should be noted that the embodiments described are exemplary only, and are not intended to limit the embodiments to any particular form or function.

In some embodiments, the method may include configuring (by the smart bridge) the routing table in accordance with the endpoint representation. This embodiment may be used in systems similar to that shown in FIG. 3, but may also be used in systems similar to FIG. 4, among others. For example, the routing table may present the virtual memory resources to the host device as a virtual representation of the devices downstream from the bridge. The host may access memory, and the routing table (e.g., in switch 309) may forward the virtual memory resources on the host's behalf.

In one embodiment, the method may include implementing, by the (smart) bridge, a proxy device based on the endpoint representation, whereby the bridge presents itself to the bus host device as the proxy device requesting the plurality of memory resources. In other words, the smart bridge may emulate a device for presentation to the host device based on what the host device expects to see. This embodiment may be used in systems similar to that of FIG. 4, where a second (e.g., non-smart) bridge is interposed between the smart bridge and a plurality of devices. However, this embodiment may also be used in systems similar to that shown in FIG. 3, among others. The forwarding address range may be received (by the smart bridge) from the downstream (second) bridge. Note that the second bridge may hide details of the original (memory) resources requested by the devices, e.g., due to its own alignment/size constraints. Moreover, under some protocols/standards or host device configurations, the host may expect to see a single device connected to the bus, and so the (smart) bridge's implementation of the proxy device may meet this requirement.

It should be noted that the forwarding address range may be provided or specified in different ways. For example, in one embodiment, the forwarding address range may include the starting address and size of the forwarding address range. The ending address of the forwarding address range may easily be determined from the starting address and size of the forwarding address range, i.e., ending address=starting address+size.

Alternatively, in some embodiments, the forwarding address range may include the starting address and an ending address. The size of the forwarding address range may be determined from these bounding addresses, i.e., size=ending address−starting address.

While the above techniques may be used in systems under any of various protocols, embodiments of the techniques disclosed may be particularly beneficial with respect to implementations directed to specific protocols/buses. For example, in some embodiments, the (smart) bridge may be configured to operate in accordance with Peripheral Component Interconnect Express (PCIe) and/or PXI Express (PXIe).

Note that the manner in which the sub-address ranges get programmed into hardware depends on the specific application and is not central to the techniques disclosed herein. For example, for BARs, they may simply be represented as a sequence. In cases where PLX switches (which may be used in PCIe systems) are used, for PLX internal tables, the table may be required to be partitioned during initialization as range sizes are determined. Otherwise the table entries can be programmed in any order.

Thus, in some embodiments, embodiments of the techniques disclosed herein may decompose an address range into an optimal combination of virtual memory resource sub-address ranges that each are a power of two (memory units) in size. In PCIe related embodiments, this attribute, combined with a means of assuring that the allocations are made contiguously, may allow allocations for PCIe devices to be made through BARs with a minimum of waste. In addition, some current or near-future products, e.g., a next-generation MXI product, may use a new bridge technology that uses an internal BAR representation for memory forwarding. Embodiments of the present invention may allow that hardware to be used without massive waste in memory resources.

More generally, embodiments of the present invention may reduce the worst case memory allocation requirement by half and may be significant for devices with larger resource needs.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A smart bridge, configured to be interposed between a bus host device and a plurality of devices that require respective amounts of memory resources of the bus host device, wherein the smart bridge comprises:

a functional unit;

memory, coupled to the functional unit; and at least one switch, coupled to the functional unit, wherein the at least one switch is configured to route data between the bus host device and the plurality of devices using a routing table;

wherein the memory stores program instructions executable by the functional unit to:

store a forwarding address range comprising a bridge representation of a plurality of hardware memory resources required by a plurality of devices, wherein the forwarding address range is an integer multiple of a first specified minimum size and is aligned with the first specified minimum size; and convert the bridge representation of the plurality of hardware memory resources to an endpoint representation comprising a plurality of virtual memory resources based on a starting address of the forwarding address range, wherein each virtual memory resource comprises a respective sub-address range with a size that is a power of 2 multiple of a second specified minimum size and is aligned with its size, wherein the second specified minimum size is less than the first specified minimum size; and wherein the endpoint representation is usable by the at least one switch or the bus host device to allocate the virtual memory resources to the plurality of devices; and wherein the bridge representation and the forwarding address range are binary numbers, and wherein to convert the bridge representation of the plurality of hardware memory resources to the endpoint representation, the program instructions are executable to:

while there are virtual memory resources to allocate:

determine if a current base address of the forwarding address range is aligned;

allocate a next virtual memory resource to the forwarding address range at the current base address, where the size of the sub-address range of the virtual memory resource is based on the least significant 1 bit of the current base address, in response to determining that the starting address of the forwarding address range is not aligned; and allocate the next virtual memory resource to the forwarding address range at the current base address, where the size of the sub-address range of the virtual memory resource is based on the most significant 1 bit of the current forwarding address size, in response to determining that the starting address of the forwarding address range is aligned.

2. The smart bridge of claim 1, wherein the starting address is aligned, wherein the bridge representation is a binary number, wherein the number of virtual memory resources is equal to the number of "1" bits in the bridge representation, and wherein to convert the bridge representation of the plurality of hardware memory resources to the endpoint representation, the program instructions are executable to:
for each "1" bit in the bridge representation, create a respective virtual memory resource whose size is equal to the value of the "1" bit's position; and
order the virtual memory resources based on the starting address of the forwarding address range, including assigning respective address sub-ranges to the respective virtual memory resources such that each sub-address range is aligned according to its size;
wherein the virtual memory resource sub-ranges are contiguous and compose the forwarding address range.

3. The smart bridge of claim 2, wherein said assigning respective address sub-ranges to the respective virtual memory resources comprises:
allocating the virtual memory resources to the forwarding address range beginning with the starting address, wherein the virtual memory resources are allocated from smallest up until an ending address of a virtual memory resource sub-range is aligned in accordance with the largest remaining virtual memory resource to be allocated; and
allocating the remaining virtual memory resources from largest down.

4. The smart bridge of claim 1, wherein the program instructions are further executable to configure the routing table in accordance with the endpoint representation.

5. The smart bridge of claim 1, wherein the program instructions are further executable to implement a proxy device based on the endpoint representation, and wherein the bridge presents itself to the bus host device as the proxy device requesting the plurality of memory resources.

6. The smart bridge of claim 1, wherein the forwarding address range is received from a downstream bridge.

7. The smart bridge of claim 1, wherein the forwarding address range comprises:
the starting address; and
size of the forwarding address range.

8. The smart bridge of claim 1, wherein the forwarding address range comprises:
the starting address; and
an ending address.

9. The smart bridge of claim 1, wherein the smart bridge is configured to operate in accordance with a protocol, the protocol comprising one or more of:
Peripheral Component Interconnect Express (PCIe); or
PXI Express (PXIe).

10. A method, comprising:
storing, by a bridge, a forwarding address range comprising a bridge representation of a plurality of hardware memory resources required by a plurality of devices, wherein the forwarding address range is an integer multiple of a first specified minimum size and is aligned with the first specified minimum size; and
converting, by the bridge, the bridge representation of the plurality of hardware memory resources to an endpoint representation comprising a plurality of virtual memory resources based on a starting address of the forwarding address range, wherein each virtual memory resource comprises a respective sub-address range with a size that is a power of 2 multiple of a second specified minimum size and is aligned with its size;
wherein the endpoint representation is usable by the bridge or a bus host device to allocate the virtual memory resources to the plurality of devices; and
wherein the starting address is aligned, wherein the bridge representation is a binary number, wherein the number of virtual memory resources is equal to the number of "1" bits in the bridge representation, and wherein said converting the bridge representation of the plurality of hardware memory resources to the endpoint representation comprises:
for each "1" bit in the bridge representation, creating a respective virtual memory resource whose size is equal to the value of the "1" bit's position; and
ordering the virtual memory resources based on the starting address of the forwarding address range, including assigning respective address sub-ranges to the respective virtual memory resources such that each sub-address range is aligned according to its size;
wherein the virtual memory resource sub-ranges are contiguous and compose the forwarding address range.

11. The method of claim 10, wherein the bridge representation and the forwarding address range are binary numbers, and wherein said converting the bridge representation of the plurality of hardware memory resources to the endpoint representation comprises:
while there are virtual memory resources to allocate:
determining if a current base address of the forwarding address range is aligned;
allocating a next virtual memory resource to the forwarding address range at the current base address, where the size of the sub-address range of the virtual memory resource is based on the least significant 1 bit of the current base address, in response to determining that the starting address of the forwarding address range is not aligned; and
allocating the next virtual memory resource to the forwarding address range at the current base address, where the size of the sub-address range of the virtual memory resource is based on the most significant 1 bit of the current forwarding address size, in response to determining that the starting address of the forwarding address range is aligned.

12. The method of claim 10, wherein said assigning respective address sub-ranges to the respective virtual memory resources comprises:
allocating the virtual memory resources to the forwarding address range beginning with the starting address, wherein the virtual memory resources are allocated from smallest up until an ending address of a virtual memory resource sub-range is aligned in accordance with the largest remaining virtual memory resource to be allocated; and
allocating the remaining virtual memory resources from largest down.

13. The method of claim 10, further comprising:
configuring the routing table in accordance with the endpoint representation.

14. The method of claim 10, further comprising:
implementing, by the bridge, a proxy device based on the endpoint representation; and whereby the bridge presents itself to the bus host device as the proxy device requesting the plurality of memory resources.

15. The method of claim 10, wherein the forwarding address range is received from a downstream bridge.

16. The method of claim 10, wherein the forwarding address range comprises:
the starting address and size of the forwarding address range; or
the starting address and an ending address.

17. The method of claim 10, wherein the bridge is configured to operate in accordance with a protocol, the protocol comprising one or more of:
Peripheral Component Interconnect Express (PCIe); or
PXI Express (PXIe).

18. A non-transitory computer accessible memory medium that stores program instructions executable by a smart bridge to implement:
storing a forwarding address range comprising a bridge representation of a plurality of hardware memory resources required by a plurality of devices, wherein the forwarding address range is an integer multiple of a first specified minimum size and is aligned with the first specified minimum size; and
converting the bridge representation of the plurality of hardware memory resources to an endpoint representation comprising a plurality of virtual memory resources based on a starting address of the forwarding address range, wherein each virtual memory resource comprises a respective sub-address range with a size that is a power of 2 multiple of a second specified minimum size and is aligned with its size;
wherein the endpoint representation is usable by the smart bridge or a bus host device to allocate the virtual memory resources to the plurality of devices; and
wherein the bridge is configured to operate in accordance with a protocol, the protocol comprising one or more of:
Peripheral Component Interconnect Express (PCIe); or
PXI Express (PXIe).

* * * * *